June 17, 1941.  C. C. KINKER ET AL  2,246,364
GLASS MELTING AND REFINING FURNACE
Filed July 24, 1937  4 Sheets-Sheet 1

Clarence C. Kinker
James C. McBurney
John A. Tausick
Robert W. Hopkins
INVENTORS BY Rulet Hoge ATTORNEYS

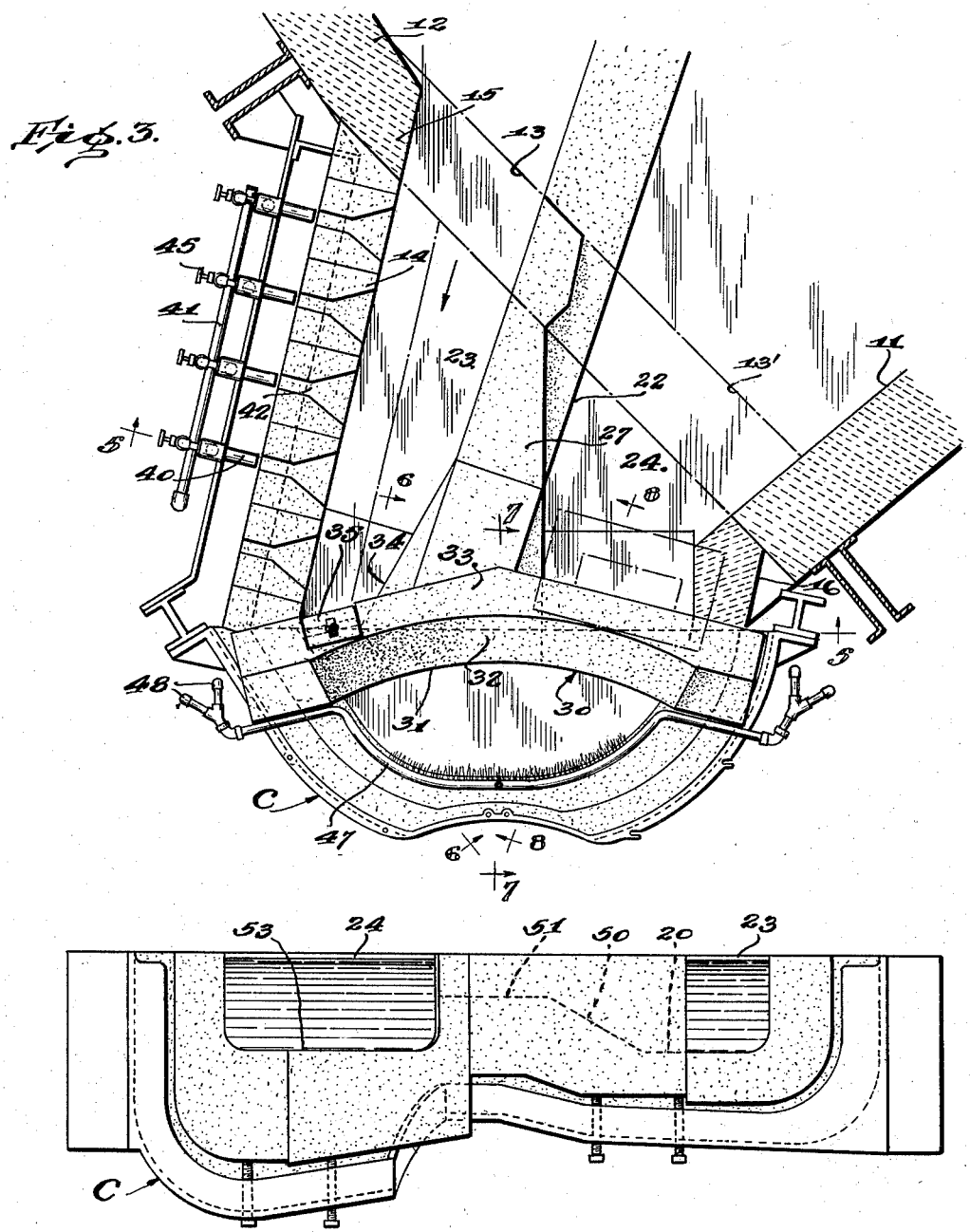

June 17, 1941.  C. C. KINKER ET AL  2,246,364
GLASS MELTING AND REFINING FURNACE
Filed July 24, 1937  4 Sheets-Sheet 3
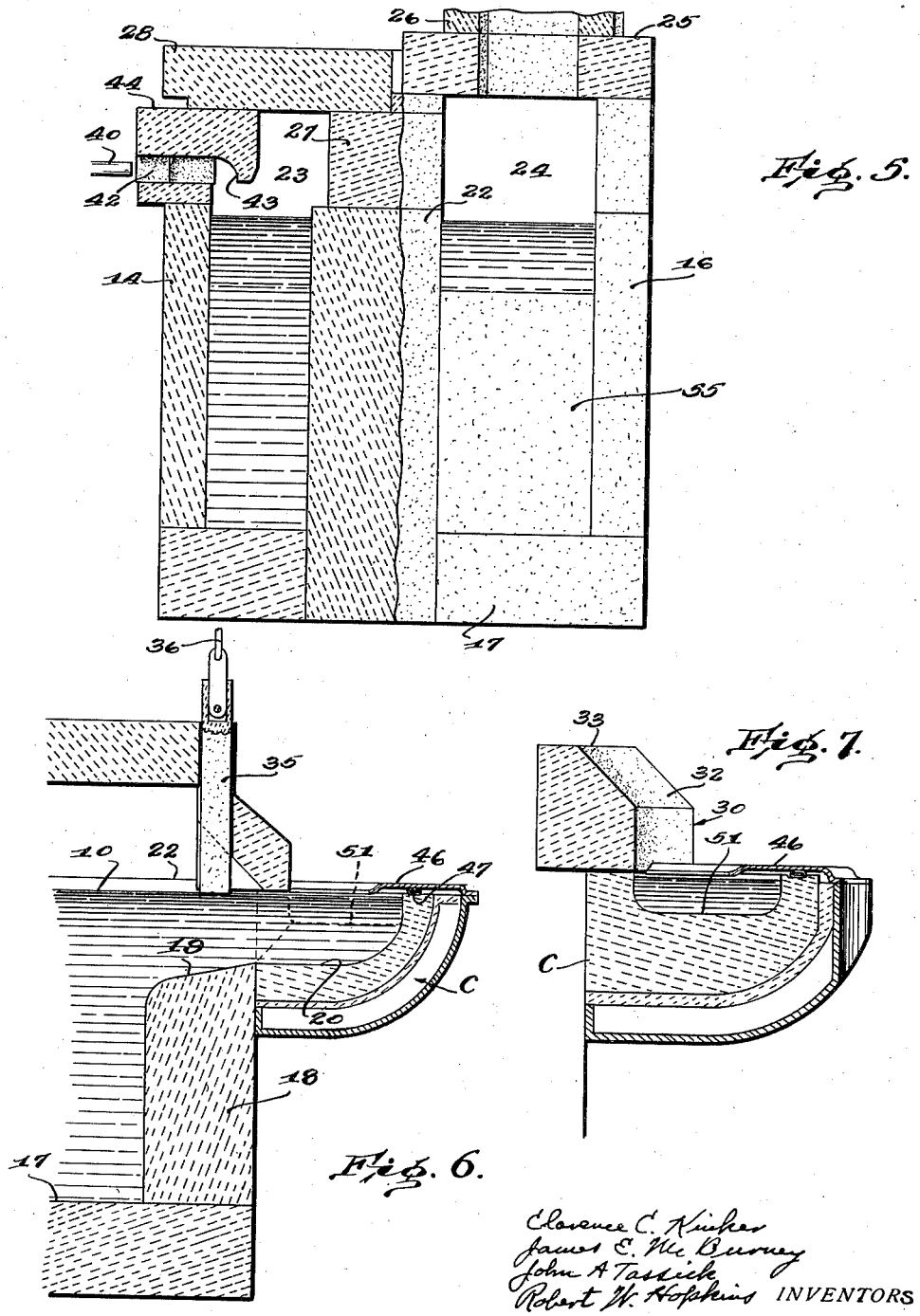

June 17, 1941.  C. C. KINKER ET AL  2,246,364

GLASS MELTING AND REFINING FURNACE

Filed July 24, 1937   4 Sheets-Sheet 4

Clarence C. Kinker
James E. McKerney
John A. Tassick
Robert W. Hopkins  INVENTORS

BY

Rule & Hoge  ATTORNEYS

Patented June 17, 1941

2,246,364

UNITED STATES PATENT OFFICE 2,246,364

GLASS MELTING AND REFINING FURNACE

Clarence C. Kinker, James E. McBurney, and Robert W. Hopkins, Alton, Ill., and John A. Tassick, New York, N. Y., assignors to Owens-Illinois Glass Company, a corporation of Ohio Application July 24, 1937, Serial No. 155,406

9 Claims. (Cl. 49—56)

Our invention relates to glass furnace constructions and particularly to furnace forebays and gathering pots from which charges of molten glass are gathered. The invention, in the form herein illustrated, is designed for use in connection with glass gathering machines, for example, of the Owens type, in which continuously traveling molds are brought in succession over a pool or body of molten glass and gather charges of glass by suction. The invention embodies a furnace construction in which a channel is provided for a continuous flow of the molten glass from a refining chamber to and through a gathering zone and thence through a return channel back into the refining chamber.

In the development of apparatus of the type indicated for use with suction gathering machines, various difficulties have been encountered, particularly in providing and maintaining an adequate circulation of the glass, controlling the temperature of the glass, maintaining uniformity of temperature and homogeneity of the glass entering the molds, providing for the complete reheating and remelting of the cutoffs or tails of glass severed from the molds after the latter have received their charges and the removal of blisters or air entrapped in the glass by the cutoffs, and preventing excessive loss of heat from the glass circulating through the channel. An object of our invention is to provide a novel construction by which the above mentioned difficulties are overcome.

A feature of the invention relates to the provision of a construction wherein the channel through which the glass circulates is free from sharp corners or angles which would retard the flow of glass through the channel and gathering zone, and also free from pockets which would permit stagnation of the glass and result in the formation of dog metal or changes in the properties of the glass.

The invention further provides an efficient and practical means for regulating and controlling the temperature of the glass flowing from the refining tank to the gathering zone, thereby permitting the temperature to be either raised or lowered to meet the particular temperature requirements at the gathering zone, this temperature being dependent upon and variable with the size of the bottles or other articles which are being made.

A further object of the invention is to provide a construction in which the shape and dimensions of the channel are such as to provide a comparatively rapid movement of the glass through the gathering area, the construction being designed to facilitate an adequate movement or circulation of the glass in a manner to insure uniform temperature of the glass entering the molds, prevent excessive loss of heat, and enable the molds to operate effectively as impelling means to assist in maintaining the circulation of glass through the channel.

In prior art constructions the opening through the wall of the refining tank into the forebay, leading to the gathering area, has usually been made quite large. As a result, in case of an accident, for example, where the gathering machine might strike the gathering pot and tear it off, the opening in the tank wall would permit a large outpour of the molten glass which it would be practically impossible to check. The present invention aims to overcome this difficulty by providing a structure in which the opening in the refiner wall is reduced to a size which would permit the glass to be frozen or the flow stopped with comparative ease in case of an emergency or for the purpose of repairs.

A further feature of the invention relates to a novel form of forebay structure which provides a relatively long incoming channel section through which the glass is conducted from the refiner to the gathering pot and a much shorter return channel section. This arrangement permits adequate temperature adjustment and control of the glass in its passage to the gathering area, and at the same time permits a quick return of the glass with its chilled portions by reducing the resistance of the flow back into the tank, preventing excessive heat losses, and permitting a relatively high temperature to be maintained in the return channel owing to its proximity to the refining tank and exposure to the hot gases therein.

A further feature of the invention relates to the construction in which the divided wall between the incoming and return channels, is extended back into the refining tank in a manner to keep the glass which has passed through the gathering zone, separate from the incoming glass until such time as it has been completely refined and cleared of blisters.

Other objects of our invention will appear more fully hereinafter.

Referring to the accompanying drawings:

Fig. 3 is a part sectional plan view, the cover blocks for the forehearth and cover plate for the gathering pot being omitted;

Fig. 4 is a rear elevation view of the gathering pot;

Figs. 5, 6, 7 and 8 are sectional elevations taken as indicated by the correspondingly designated section lines on Fig. 3.

Figures 1, 2:
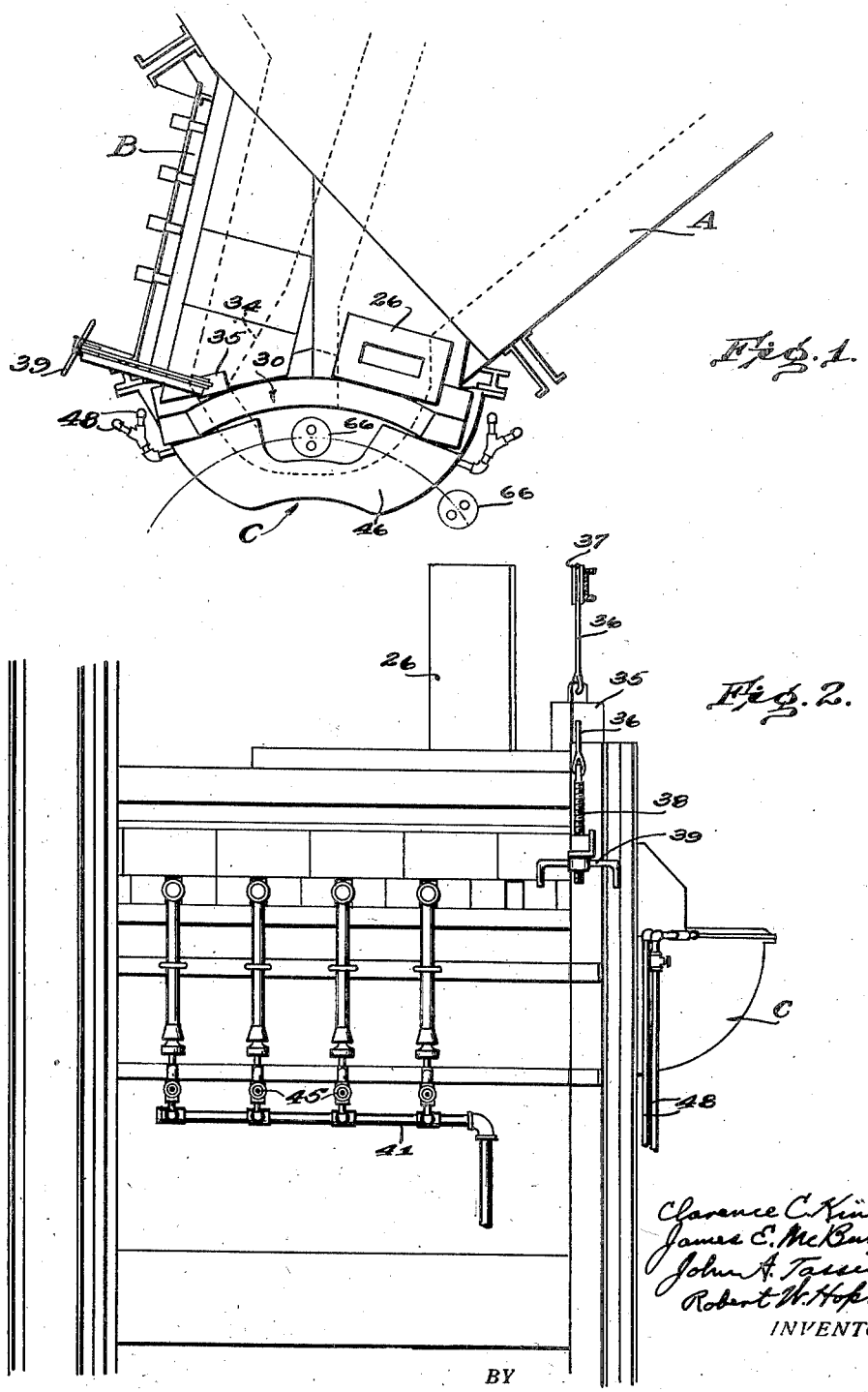
Fig. 1 is a diagrammatic plan view of apparatus constructed in accordance with our invention.
Fig. 2 is a side elevation on a larger scale.
Figure 8:
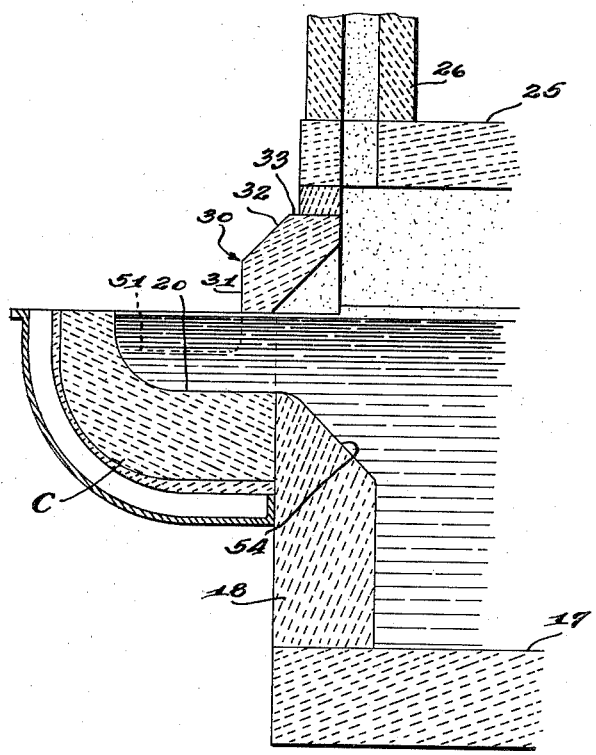

Referring to the drawings, a refining tank A is provided with an extension or forehearth B on the forward end of which is a gathering pot C. The forehearth and gathering pot are constructed to provide a channel through which molten glass flows from the tank to the gathering zone within the pot C and thence back into the tank. The refining tank A which may be of usual construction, provides a continuous supply of molten glass 10. The tank comprises vertical walls 11 and 12, the wall 12 being formed with openings 13 and 13' to register with the channels in the forebay B. The forebay comprises a vertical wall 14 extending forward from the wall 12 at an acute angle to that section of the wall 12 subtended by the forebay. The inner face of the wall 14 is shown as being flush with the vertical surface 15 of the wall 12, which surface forms a margin of the opening 13.

The vertical wall 16 at the opposite side of the forebay is comparatively short and the inner end thereof terminates flush with the inner face of the tank wall 11. The floor 17 of the forebay is preferably on a level with the floor of the refining tank A and forms an extension thereof. The outer end of the forebay is formed by a vertical wall 18 in front of which is mounted the gathering pot C. The upper surface 19 (Fig. 6) of that portion of the wall 18 over which the glass flows into the pot C, is upwardly and forwardly inclined and at its upper edge is flush with the adjoining portion 20 of the floor surface of the gathering pot C.

A vertical partition wall 22 extends rearwardly from the pot C through the forebay into the refining tank, and separates the incoming channel 23 through which the glass flows from the tank to the gathering pot, from the outgoing or return channel 24 through which the glass is returned to the refining chamber. The wall 22 as shown in Fig. 5 extends from the bottom of the tank and forebay upward to a level above the normal level of the glass in the tank. The wall 22 extends a substantial distance within the refining tank so that the glass which is returned to the tank from the gathering area cannot take a short circuit to the channel 23 but must follow a path which will insure adequate reheating and reconditioning of the glass before it can again reach the gathering zone.

The return channel 24 being short and relatively wide, permits the chilled portions or tails of glass to flow freely back into the high temperature zone within the refiner A. It also permits the hot gases from the refiner to contact with the glass in the channel 24 so that the temperature within the return channel may be considerably higher than that in the channel 23, thus facilitating the reheating of the glass and the removal of blisters or air bubbles therefrom. The channel 24 is provided with a roof or cover block 25 from which rises a stack 26 through which hot gases are exhausted from the refining chamber by way of the channel 24. Mounted upon and forming a part of the partition wall 22 is a block or wall section 27 which provides a support for the cover block 25 and a cover block 28, the latter overlying the incoming channel 23.

A jack arch 30 extends across the gathering pot, about at the vertical plane at which the pot joins the forebay B. The front vertical wall 31 of the arch is in an arc of a circle concentric with the path of travel of the molds through the gathering zone. The jack arch as shown comprises an upwardly and rearwardly inclined outer surface 32 and an upper horizontal surface 33.

The vertical walls of the incoming channel 23 are convergent in a forward direction so that said channel at the pot C is considerably narrower than at the tank wall. The inner wall section 34 adjacent the gathering pot is inclined at a greater angle to the opposite wall so that the forward portion of the channel narrows down comparatively rapidly.

At the forward end of the incoming channel 23 is a vertically disposed block or gate 35 which bridges the channel and extends downward to a point below the level of the glass. The gate is adjustable up and down by an adjusting mechanism including a cable 36 attached to the upper end of the block and running over pulleys 37 mounted on the framework of the furnace. The opposite end of the cable is connected to a screw rod 38 on which is threaded a hand crank 39. The block 35 controls the depth at which the glass is drawn from the refining tank into the channel and also serves as a skimmer block. By means of the hand crank 39, the gate may be adjusted up and down to adjustably vary said depth. This serves as a means to control to a considerable degree the temperature of the glass entering the channel.

A further temperature regulating means is provided by a series of gas burners comprising nozzles 40 to which gases are supplied through a manifold pipe 41. The burners project the flames through openings 42 extending through the top block 44 of the channel wall 14, above the glass level. The walls of the openings 42 may be flared as shown to effect an even distribution of the burning gases, the latter being directed downwardly against the surface of the glass by an overhanging lip 43 formed on the block 44. Valves 45 individual to the burners permit a selective use of the burners and a regulated control of each individual burner by which the amount of heat supplied to the glass flowing through the incoming channel 23 may be adjustably varied, and also may be applied at any desired part of the channel. When it is desired to lower the temperature in the channel, cooling air may be supplied through the manifold 41 and nozzles 40.

A cover plate 46 is mounted to overlie the upper surface wall of the gathering pot and to extend inwardly therefrom to partially cover the glass therein and define the forward edge of the exposed gathering area. Interposed between the cover plate and the top surface of the pot is a burner pipe 47 closely adjacent to the inner edge of the wall and following the contour thereof. Said pipe is formed with a multiplicity of jet openings from which flames may be projected over the exposed surface of the glass. Fuel gas and air or other combustion supporting gas are supplied through pipes 48 to the pipe 47.

Figure 9:
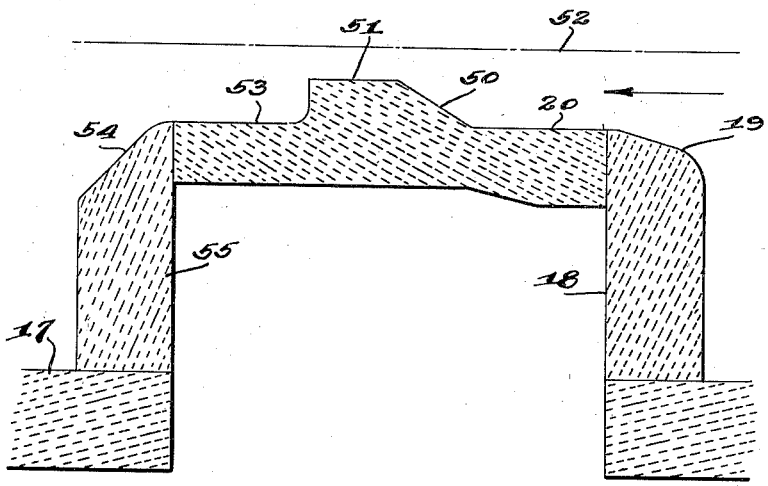
Fig. 9 is a schematic sectional elevation, being a development of a section taken substantially along the center line of the path of flow through the incoming channel, gathering zone and return channel.

By reference to Fig. 5, it will be seen that the incoming channel 23 is quite deep, being the full depth of the furnace tank and forebay. Where the channel enters the gathering pot, the depth is greatly reduced, as before noted, by means of the wall 18, the upper surface 19 of which merges into the floor surface 20 of the pot C. Referring to the schematic view, Fig. 9, which indicates the depth of the entire channel including the inlet channel 23, gathering zone and return channel 24, it will be seen that the floor of the pot comprises the section 20 which extends substantially horizontally from the wall 18 toward the gathering area, an upwardly inclined surface 50 extending from the surface 20 to a horizontal surface 51 representing the central gathering area. The glass level is indicated by the line 52, and it will be noted that in the central gathering area the glass is quite shallow. At the forward end of the horizontal surface 51, the line extends abruptly downward to a lower level 53 which represents that section of the floor of the pot extending back to the front wall of the forehearth at the return side thereof. The surface 53 merges into the downwardly and rearwardly inclined top surface 54 and the block 55 which forms the front wall of the forehearth B at the entrance of the return channel into the forehearth.

It will be observed that the inlet channel 23 is quite deep through the major portion of its length, namely, throughout the length of the forehearth, with its walls gradually convergent, the depth of the channel being abruptly reduced at the entrance to the pot C, the depth being still further reduced at the central gathering area so that a comparatively rapid flow is obtained while the molds 66 are over the central section 51 and gathering their charges of glass. Beyond the central gathering area, the depth of the return channel section within the pot C abruptly increases. The return channel section within the forehearth is wide, short, and its side wall divergent so that little obstruction is offered to the free flow of the chilled portions and tails of glass back into the furnace. It will be further observed that the angular change in the direction of current flow from the gathering zone back into the tank is relatively small owing to the angular arrangement of the forebay and pot C relative to the refining tank, thus further reducing the resistance to the free return flow of the glass and also avoiding the usual corners or pockets in which glass may stagnate and form dog metal or deteriorate.

It will be seen further that the cross-sectional areas of the channels where the pot C joins the forebay are quite small and shallow as compared with the openings 13 and 13' at the junction of the tank and forebay. With such construction, any accidental displacement of the pot C would result in only a comparatively small outflow of the molten glass and would permit such flow to be stopped by freezing or otherwise with comparative ease, and at most would only permit the escape of a relatively small proportion of the glass in the tank.

The arrangement by which a comparatively rapid flow of the glass past the gathering area is obtained, is of special value as a means for obtaining uniformity of temperature and homogeneity in the glass entering the molds and particularly where double cavity molds are employed as indicated in Fig. 1. The rapid movement of the glass through the gathering area, prevents undue chilling of the more exposed portions traversing the outer or front zone of the gathering area, so that glass of equal temperature is drawn into both or all the mold cavities.

The incoming channel 23 with its forwardly convergent side walls, narrows down under the jack arch prior to the point at which the blank molds 66 or other gathering media contact the glass for gathering their charges of glass. The edge of the inner wall of the channel is so located in relation to the gathering zone and to the machine carrying the molds 66, that an extension of the mold radius when the mold is at the point of dip, would fall within the channel wall beneath the jack arch. By the term "mold radius" is meant a radius of the circle defining the path of travel of the mold and extending from the mold to the axis about which the mold rotates. By means of the arrangement just described, uniform temperature of the glass within the gathering zone is assured regardless of the direction of glass flow through the incoming channel.

Modifications may be restorted to within the spirit and scope of our invention.

We claim:

1. A glass melting and refining furnace comprising in combination a refining tank, a forebay positioned externally of the tank and formed with a channel through which molten glass is caused to flow from the tank through a gathering zone and back into the tank, said channel including a deep incoming channel section through which the glass is conducted from the tank toward the gathering zone, a deep return channel section through which the glass is returned from the gathering zone into the tank, and a comparatively shallow intermediate channel section extending through the gathering zone, said intermediate channel section comprising a floor including a central horizontal floor portion at a comparatively high level defining a central gathering area and by which a comparatively rapid and uniform flow is obtained across the gathering area, and portions at a lower level extending between said high level portion and the said incoming and return channel sections respectively.

2. A glass melting and refining furnace comprising in combination a refining tank, a forebay positioned externally of the tank and formed with a channel through which molten glass is caused to flow from the tank through a gathering zone and back into the tank, said channel including a deep incoming channel section through which the glass is conducted from the tank toward the gathering zone, a deep return channel section through which the glass is returned from the gathering zone into the tank, a comparatively shallow intermediate channel section extending through the gathering zone, said intermediate channel section comprising a floor including a central horizontal floor portion at a comparatively high level defining a central gathering area and by which a comparatively rapid and uniform flow is obtained across the gathering area, and portions at a lower level extending between said high level portion and the said incoming and return channel sections respectively, said incoming channel section at its junction with said intermediate section being much narrower than the said return channel section, a gate bridging the channel at the junction of said incoming section and said intermediate section, said gate projecting downward below the glass level, and means for adjusting the gate up and down to regulate the depth at which the glass is drawn from said incoming channel section into the gathering zone.

3. The combination of a furnace tank having a vertically disposed wall, a forehearth comprising side walls extending forward from said tank wall, means dividing the forehearth into incoming and return channels, a gathering pot at the forward end of said forehearth and opening into said channels, said incoming channel being of much greater length than said return channel, cover blocks over said channels, and a stack rising from the said return channel adjacent to the gathering zone, and providing means through which hot gases are exhausted from the furnace tank by way of said return channel.

4. The combination of a furnace tank having a vertically disposed wall, a forehearth comprising side walls extending forward from said tank wall, means dividing the forehearth into incoming and return channels, a gathering pot at the forward end of said forehearth and opening into said channels, said incoming channel being of much greater length than said return channel, and said channels being of much greater depth than said gathering pot, a gate at the forward end of said incoming channel controlling the flow of glass from the channel into the gathering pot, said gate projecting downward below the glass level and being adjustable up and down, cover blocks over said channels, and a stack rising from the said return channel adjacent to the gathering zone, and providing means through which hot gases are exhausted from the furnace tank by way of said return channel.

5. The combination of a furnace tank having a vertically disposed wall, a forehearth comprising side walls extending forward from said tank wall, means dividing the forehearth into incoming and return channels, a gathering pot at the forward end of said forehearth and opening into said channels, said incoming channel being of much greater length than said return channel, and said channels being of much greater depth than said gathering pot, a gate at the forward end of said incoming channel controlling the flow of glass from the channel into the gathering pot, said gate projecting downward below the glass level and being adjustable up and down, cover blocks over said channels, a stack rising from the said return channel adjacent to the gathering zone, and providing means through which hot gases are exhausted from the furnace tank by way of said return channel, the exterior wall of the said incoming channel being provided with port openings at intervals therealong, nozzles arranged to direct temperature regulating gases through said openings for regulating the temperature of the glass flowing through the channel, and means individual to said nozzles for controlling the flow of gases therethrough.

6. A furnace structure comprising in combination, a refining tank including a vertical wall, a forehearth extending forward from said wall, said forehearth including vertical side walls, one of which is arranged at an acute angle to the plane of said tank wall and of much greater length than the opposite side wall of the forehearth, a partition wall dividing the forehearth into a long incoming channel and a short return channel, and a gathering pot at the forward end of the forehearth and communicating with said channels.

7. The combination of a refining tank having a vertical front wall formed with an opening therein, a forehearth abutting and extending forward from the outer face of said wall, a gathering pot at the forward side of the forehearth, and a partition wall dividing the forehearth into incoming and return channels leading to and from the gathering pot, said partition wall extending rearwardly through and beyond said opening into the tank, the floor of the forehearth being exterior to the tank and substantially on a level with the floor of the tank, and the floor of said pot being at a much higher level.

8. The combination of a refining tank having a vertical front wall formed with an opening therein, a forehearth abutting and extending forward from the outer face of said wall, a gathering pot at the forward side of the forehearth, and a partition wall dividing the forehearth into incoming and return channels leading to and from the gathering pot, said partition wall extending rearwardly through and beyond said opening into the tank, the floor of the forehearth being exterior to the tank and substantially on a level with the floor of the tank, and the floor of said pot being at a much higher level, said forehearth having vertical front wall sections uniting the floors of the pot and said channels, the upper surfaces of said front wall sections being substantially at the level of the floor of the gathering pot.

9. The combination of a refining tank having a vertical front wall formed with an opening therein, a forehearth abutting and extending forward from the outer face of said wall, a gathering pot at the forward side of the forehearth, and a partition wall dividing the forehearth into incoming and return channels leading to and from the gathering pot, said portition wall extending rearwardly through and beyond said opening into the tank, the floor of the forehearth being exterior to the tank and substantially on a level with the floor of the tank, and the floor of said pot being at a much higher level, said forehearth having vertical front wall sections uniting the floors of the pot and said channels, the upper surfaces of said front wall sections being substantially at the level of the floor of the gathering pot, the floor of said pot comprising an intermediate section at a substantially higher level than the floor portions adjoining said front wall sections.

CLARENCE C. KINKER.
JAMES E. McBURNEY.
ROBERT W. HOPKINS.
JOHN A. TASSICK.